United States Patent Office 3,288,829
Patented Nov. 29, 1966

3,288,829
PROCESS FOR PREPARING CYCLOPENTADIENYL
GROUP VB AND VIB METAL HYDRIDES
Geoffrey Wilkinson, London, England, assignor to Ethyl
Corporation, New York, N.Y., a corporation of
Virginia
No Drawing. Filed Dec. 29, 1961, Ser. No. 163,088
Claims priority, application Great Britain, Jan. 19, 1961,
2,173/61
10 Claims. (Cl. 260—429)

This invention relates to novel organometallic compounds and a process for preparing the same. The novel process disclosed herein is also applicable to the preparation of compounds which are not new. When the novel process of this invention is employed, high yields of these previously known compounds are obtained.

More specifically, this invention relates to cyclopentadienyl transition metal hydrides, especially those of the Group VB metals having an atomic number of at least 41. The novel process of this invention can also be used to prepare the dicyclopentadienyl tantalum and niobium trihydrides and dicyclopentadienyl Group VIB metal dihydrides.

An object of this invention is to provide new chemical compounds, specifically, dicyclopentadienyl tantalum and niobium trihydrides. A further object is to provide a process for producing these novel compounds and the dicyclopentadienyl Group VIB dihydrides. Still another object of this invention is to provide an improved method for plating tantalum and niobium. Another object is to provide an economical method for plating tantalum and niobium on a variety of substrates. Additional objects of this invention will be apparent from the following discussion and the appended claims.

The above objects are accomplished by providing compounds having the formula $Cy_2MH_3$, wherein Cy is a cyclopentadienyl radical having 5 to 13 carbon atoms, and M is an atom of a Group VB transition metal of atomic number at least 41.

The new compositions of matter of this invention are composed of three distinctive moieties; namely, two equivalents of the cyclopentadienyl radical, one equivalent of a Group VB transition metal having an atomic number of at least 41, and three equivalents of hydrogen.

Normally, the hydrogen radicals incorporated within the molecules of these new compounds are ordinary hydrogen radicals. However, by using a reducing agent such as sodium borodeuteride and lithium aluminum deuteride, heavy hydrogen can be incorporated within the molecules of the new compositions of matter of this invention. Thus, compounds such as di[cyclopentadienyl] tantalum trideuteride and di[ethylcyclopentadienyl] niobium trideuteride and the like can be prepared.

The metal atoms in the novel compounds of this invention are either niobium or tantalum.

The third constituent of the new compounds of this invention comprises a cyclopentadienyl radical. In general, this constituent can be selected from four generic types of radicals having up to about 13 carbon atoms, all incorporating the cyclopentadienyl configuration.

Hence, the cyclopentadienyl radical may be the cyclopentadienyl radical or the cyclopentadienyl radical substituted with univalent hydrocarbon radicals such as alkyl, alkenyl, aralkyl, aralkenyl, cycloalkyl, and cycloalkenyl radicals. The univalent radicals which may be substituted on the cyclopentadienyl ring may have one to about 8 carbon atoms. Thus, such radicals as the methyl, isopropyl, tertiary butyl, benzyl, α-phenylethyl, phenyl, β-ethylphenyl, cycloamyl, cyclohexyl ethyl, and α-cyclohexyl ethenyl radicals and the like may appear as substituents on the cyclopentadienyl ring. The cyclopentadienyl ring may be polysubstituted. However, the total number of carbon atoms within the ring plus the carbon atoms of the substituent radicals is no higher than about 13.

The second type of cyclomatic radical is the indenyl radical represented by the general formula

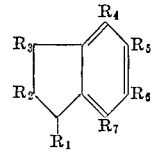

wherein each of the R groups can be the same or different and is selected from the group consisting of hydrogen and organic radicals. Illustrative examples of such cyclomatic radicals are indenyl, 3,4-diethylindenyl, 3-phenylindenyl, and the like.

The third type of cyclomatic radical which may be incorporated within the new compositions of matter in the instant invention is a radical of the fluorenyl type which can be represented by the general formula

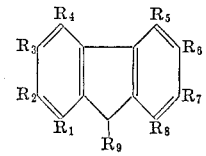

Again, each of the R groups in the above formula can be alike or different and is selected from the class consisting of hydrogen and organic radicals, similar to those described above. Thus, radicals such as the fluorenyl, the 3-ethyl fluorenyl, the 4,5-dimethyl fluorenyl radicals and the like are applicable in this invention.

The fourth type of cyclomatic radical can be represented by the general formula

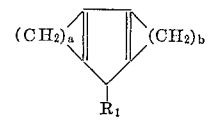

wherein $a$ and $b$ can be the same or different and are small whole integers including zero and excluding one, and wherein $R_1$ is selected from the class consisting of hydrogen and organic radicals. Illustrative examples of this type of radical which contains the cyclopentadienyl configuration include 4,5,6,7-tetrahydroindenyl, 1,2,3,4, 5,6,7,8-octahydrofluorenyl, 6-methyl, 4,5,6,7-tetrahydroindenyl, and the like.

The new compounds of this invention are the first trihydride derivatives of organometallic compounds of niobium or tantalum. Niobium and tantalum are the two heavier members of Group VB of the Periodic Table. However, they more closely resemble each other than they resemble the lightest member, vanadium.

Further objects of this invention are accomplished by providing a process for the formation of organometallic complexes having the formula $$Cy_2M^1H_x$$

wherein Cy is a cyclopentadienyl radical having 5 to 13 carbon atoms, $M^1$ is an atom of a metal selected from the class consisting of Group VB metals of atomic number at least 41 and Group VIB metals, when $M^1$ is an atom of a Group VB transition metal of atomic number at least 41, $x$ is equal to three, and when $M^1$ is an atom of a Group VIB metal $x$ is equal to two.

The process of this invention comprises the reaction of a salt of the metals above described with a compound having the formula $Cy_tM^2$ wherein Cy is a cyclopentadienyl radical as described above and M² is an atom of a metal selected from the class consisting of Group IA and Group IIA metals. The above reaction is carried out in the presence of a reducing agent.

As stated above, a salt of niobium, tantalum, chromium, molybdenum and tungsten is employed as the source of the desired metal in the process of this invention. These salts can be salts of inorganic or organic acids. The preferred organic acids are those composed entirely of carbon, hydrogen and oxygen. Thus, salts of acetic, propionic, butyric, and benzoic acids and the like are applicable in the present invention. Because of their availability, niobium, tantalum, chromium, molybdenum and tungsten acetates are preferred. The most preferred salts of these metals are salts derived from inorganic acids such as the hydrohalic acids, sulfuric acids and phosphoric acids. The preferred salts are the metal halides and the most preferred salts are the metal chlorides.

The second reactant employed in the process of this invention is a metal cyclopentadienide wherein the metal atom is selected from the class consisting of Group IA and IIA metals. Thus, compounds such as sodium cyclopentadienide, lithium cyclopentadienide, potassium tert-butyl cyclopentadienide, and the like are employed in the instant process. Similar compounds of rubidium and cesium are also applicable. Compounds consisting of two cyclomatic radicals and a Group IIA metal (magnesium, calcium, barium and strontium) can be employed in the instant process. Because of their greater reactivity, the calcium and magnesium derivatives are preferred. The most preferred cyclopentadienides employed in the process of this invention are the alkali metal cyclopentadienides, especially the highly preferred sodium compounds. The cyclopentadienyl radicals contained within the metal cyclopentadienides have been described with particularity hereinabove.

The third reactant in this new process is a reducing agent. Because of their great activity, reducing agents such as lithium aluminum hydride and lithium aluminum deuteride, sodium borohydride, and sodium borodeuteride are preferred. The exact chemical constituency of the reducing agent employed in this process is not important. What does touch the heart of the process is the reducing characteristics of the particular reducing agent employed. Consequently, a wide variety of reducing agents are applicable in the instant process and are readily apparent to those skilled in the art.

The process of this invention is conducted in the liquid phase. Necessarily therefore, a solvent is employed. The solvent can be chosen from a wide variety of organic solvents such as hydrocarbons, e.g., petroleum ether, n-hexane, isooctane, and the like or aromatic solvents such as benzene, toluene and the like. Ketones such as acetone can be employed. However, the most preferred solvents are the ethers, especially the polydentate ethers and tetrahydrofuran.

Thus, ethers such as diethylether, dibutylether, and the like are examples of simple monoethers which can be employed in the instant invention. Furthermore, diethers such as dimethylglycol diethylether, propyleneglycol dibutylether, hexyleneglycol diamylether, and the like can be employed. Typical tridentate ethers suitable in the process of this invention are diethyleneglycol dimethylether, diethyleneglycol dibutylether and the like. Cyclic ethers such as ethylene oxide, tetrahydrofuran, dioxane, trioxane and 1,3,5,7-tetroxocane and the like may be employed.

Higher polyethers and the thioether analogs of the compounds previously described are also applicable in the instant invention.

An ideal reaction medium is a solvent for the reactants and intermediates which has a high heat capacity and which would be readily separated from the product and unused reactants and would also be inert with respect to the reactants and the products. From a practical viewpoint, highly successful results are obtained when tetrahydrofuran and the polydentate ethers are employed.

The process of this invention can be carried out at a temperature within the range of −20 to about 160° C. The most preferred temperature range is 50° to 120° C. This new process is satisfactorily carried out at atmospheric pressure. However, pressures as low as 0.10 mm. to as high as 1,000 p.s.i.g. can be employed if desired.

The time of the reaction is not a truly independent variable, but depneds upon the reaction conditions employed. For example, if the solvent has many of the desirable characteristics mentioned above, and the temperature is rather high, the time of the reaction will be correspondingly reduced. Similarly, if the solvent employed is not a good solvent for the reactants, and the temperature used is rather low, the time of the reaction will be lengthened. It is preferred to use those reaction variables wherein the time of the reaction is within the range of 30 minutes to about 30 hours. The preferred range is ten to twenty hours. It has been found that when reaction variables are employed which enable the reaction to be carried out within this time range, the yields are maximized and undesirable side reactions are kept to a minimum.

It is preferred that the process be carried out under a blanketing atmosphere of an inert gas such as nitrogen, argon, krypton and the like. Because of its low cost, nitrogen is the inert gas of choice. Similarly, to obviate undesirable side reactions, it is preferred that the solvent employed be carefully de-aerated prior to use.

The compounds produced by my process are readily separated from the reaction mixture by conventional means such as evaporation followed by sublimation, chromatography, solvent extraction and the like.

To further illustrate the invention, the following examples are presented. All parts are in parts by weight.

EXAMPLE I

In a suitable reaction vessel equipped with heating means, stirring means, and condensing means, 22 parts of sodium cyclopentadienide was dissolved in 420 parts of tetrahydrofuran. To this was added 15 grams of sodium borohydride and the solution cooled to about −50° C. Tantalum pentachloride, 45 parts, was then added to the cooled solution and the mixture was refluxed under nitrogen for about 12 hours. After that time, the tetrahydrofuran was removed by distillation and the solid residue was broken up, under nitrogen, and sublimed in portions, under vacuum, at 110 to 120° C. to a probe cooled by Dry Ice acetone. The yield of bis(cyclopentadienyl) tantalum trihydride was 70 to 80 percent. The compound was a white micro-crystalline solid which was stable in air for a short time and was soluble in benzene. The compound does not behave as a base toward acids. The compound reacts with carbon disulfide, carbon tetrachloride and hexachlorobutadiene. The structure of the compound was verified by infrared and high resolution nuclear magnetic studies.

When the above example was repeated using glycol dimethylether as the solvent, the compound was again obtained in high yield.

When the above procedure is followed using potassium indenylide, rubidium tert-butyl cyclopentadienide, and cesium fluorenide good yields of bis(indenyl) tantalum trihydride, bis(tert-butyl) tantalum trihydride and bis(fluorenyl) tantalum trihydride are prepared.

EXAMPLE II

The procedure of Example I is followed except that an equivalent quantity of niobium pentachloride is used in lieu of the tantalum pentachloride. The compound bis(cyclopentadienyl) niobium trihydride is prepared. Similarly, this compound can be prepared if calcium or magnesium cyclopentadienide is used in place of the sodium cyclopentadienide employed in Example I.

EXAMPLE III

The procedure of Example I is followed except that an equivalent amount of lithium aluminum deuteride is used in lieu of the sodium borohydride. Bis(cyclopentadienyl) tantalum trideuteride is prepared.

EXAMPLE IV

The procedure of Example I is followed except that diethyleneglycol dimethylether is used as the solvent. A high yield of bis(cyclopentadienyl) tantalum trihydride is prepared.

EXAMPLE V

The procedure of Example I is followed except that niobium acetate is used in lieu of the tantalum pentachloride. Bis(cyclopentadienyl) niobium trihydride is prepared. Similar results are obtained if niobium butyrate is used as the source of the niobium metal.

EXAMPLE VI

The procedure of Example I is followed except that chromium chloride ($CrCl_3$) is used in lieu of the tantalum pentachloride. The compound dicyclopentadienyl chromium dihydride is prepared.

EXAMPLE VII

The procedure of Example I is followed except that molybdenum chloride ($MoCl_5$) is used in lieu of the tantalum pentachloride. The compound dicyclopentadienyl vanadium dihydride is prepared.

EXAMPLE VIII

The procedure of Example I is followed except that tungsten chloride ($WCl_6$) is used in lieu of the tantalum pentachloride. The product is dicyclopentadienyl tungsten dihydride.

EXAMPLE IX

*Vapor phase plating of a steel with cyclopentadienyl tantalum trihydride*

A suitable quantity of cyclopentadienyl tantalum trihydride is placed into a reservoir equipped with heating means. The reservoir is connected through a valve, to a plating chamber wherein the object to be plated, a steel plate, is supported. The steel plate is connected to a temperature measuring device. The plating chamber is equipped with an induction coil which surrounded the metal object to be plated. The plating chamber was connected to a cold trap downstream from the reservoir and the cold trap is connected to a vacuum pump. The system is evacuated to a pressure less than 0.2 mm. of mercury. The reservoir is heated sufficiently to volatilize the bis(cyclopentadienyl) tantalum trihydride and to provide a steady continuous evolution of that compound. The temperature of the steel plate is raised to 400–550° C.

Upon contact of the vapor with the hot steel plate, a metallic tantalum-containing deposit is deposited on the plate. The organic vapors resulting from the decomposition of the plating compound together with the unused plating compound are collected in the cold trap. The unused material is recovered by suitable extraction and crystallization and used in another run.

Any material which can withstand a temperature at 400° C. can be plated with a tantalum or niobium containing deposit using this technique and the new compounds of this invention. Iron, copper, bronze, brass, chromium, and various porcelains and other ceramics can be coated.

As mentioned previously, an object of this invention is to provide an improved method for plating tantalum and niobium on a diversity of substrates. A further object is to provide a more efficient and effective method for plating tantalum in an economical manner.

The above and other objects are accomplished by a process for plating a Group VB metal of atomic number at least 41 upon a substrate which comprises thermally decomposing a vapor consisting essentially of the dicyclopentadienyl trihydrides of niobium and tantalum in contact with said substrate wherein said process is conducted at a temperature of from about 200° C. to about 600° C., and at a pressure of from about 0.01 mm. to about 10 mm. of mercury. The objects set out hereinabove are further accomplished by a process for plating tantalum or niobium on a substrate which comprises heating said substrate to a temperature of between about 200° C. to about 500° C. and contacting a vapor consisting essentially of one of the compounds prepared by the process of this invention with said substrate wherein said contacting is carried out at a pressure of between about 0.01 mm. to about 10 mm. of mercury.

The deposition chamber pressure may range from about 0.001 mm. of mercury to about 30 mm. of mercury. The preferred pressure in the deposition chamber is from about 0.01 to about 10 mm. of mercury since better plates are obtained within this pressure range and transportation of the plating vapor is facilitated. The most preferred pressure range is from about 0.01 to about 0.5 mm. of mercury since better results are obtained within this range.

In the plating process of this invention a carrier gas is not required or desirable. Generally, carrier gases tend to react with the metal being plated to form carbides, nitrides or other products as the metal is deposited upon the substrate. Furthermore, carrier gases usually contain small amounts of impurities which ultimately effect the plating process. Hence, a carrier gas is not generally used in the process of this invention and is preferably avoided. However, under some circumstances, carrier gases such as hydrogen, carbon dioxide, nitrogen and argon may be tolerated and used to facilitate the flow of the vaporized plating compound.

In initially vaporizing the plating compound prior to its use in the actual plating operation, temperatures from about 100° C. to about 200° C. may be used. It is preferred, however, to vaporize the cyclopentadienyl tantalum of niobium trihydride compounds at temperatures from about 150° C. to about 200° C. The temperature used depends on the flow rate desired.

The flow rate of the niobium or tantalum containing vapor is dependent to a certain extent upon the amount of pressure in the plating chamber and the temperature to which the chromium hexacarbonyl is subjected. Ordinarily, the flow rates of the plating compound employed vary from about 1 foot per minute to about 30 feet per second although faster or slower rates can be employed.

The time required to plate the tantalum or niobium by the process of this invention varies over a wide range, depending on flow rate, desired coating thickness, deposition chamber pressure, temperature of the substrate and the vaporization temperature of the plating compound. However, times from about 15 minutes to about 10 hours are generally acceptable. For economic reasons, it is preferred, however, that the process time range from about 30 minutes to about 3 hours, depending on the desired thickness of the chromium coating.

Well adherent niobium and tantalum metal coatings can be obtained through depositing its vapor directly upon any substrate that can withstand the plating conditions. Typical examples of substrates which may be plated are nickel, Pyrex glass, beryllium, molybdenum, graphite, ceramics, high temperature resistant plastics, and the like. The preferred substrates which can be plated are ferrous metal substrates, aluminum and the like.

In some cases, the substrate to be plated is preferably subjected to initial preparation. This is especially true in the case of metal substrates. In other words, the degree of adherence achieved through the unique vapor plating process of this invention, in some instances where desirable, can be further improved by an appropriate metal surface pre-treatment. The best metal surface preparation is achieved through degreasing with a solvent such as 1,1,2-trichloroethylene or the like followed by light sand blasting. The vapor plated coatings have even better adherence on slightly uneven surfaces, such as created by sand blasting, than on highly polished substrates. Thus, not desiring to be bound by theoretical considerations, it is felt that sandblasting permits a better anchoring effect of the deposited metal which penetrates into the small pits of the surface. On substrates such as graphite and ceramics where the surface is already nonuniform, if desired, degreasing can be performed to assure a clean plating surface. Other substrate pre-treatments known to the art can be employed, if desired, and will now be evident for the above and other substrates.

The types of apparatus which may be used for the plating operation are any of the apparatus described in the prior art, such as set forth by Lander and Germer in "Plating Molybdenum, Tungsten and Chromium by Thermal Deposition of Their Carbonyls," or by Powell, Campbell and Gonser in the book, "Vapor Plating," John Wiley and Sons, New York, 1955, wherein a vacuum chamber is used.

Heating may be achieved by numerous methods. Generally, resistance heating, infrared heating or induction heating are used according to the nature of the substrate and the type of equipment which is employed since the equipment largely determines the heat requirements. Flat samples such as metal plates can generally be heated by resistance heating apparatus such as a hot plate. For uneven shaped objects, induction heating or infrared heating may be used, depending on the nature of the substrate.

For the plating operation of this invention, the object to be plated is heated to a temperature of 250 to 550° C. preferably 300 to 450° C. in an enclosed chamber. The system is evacuated and the plating agent is heated to an appropriate temperature wherein it possesses vapor pressure of preferably up to about 5 mm. of mercury. In most instances, the process is conducted at no lower than 0.01 mm. mercury pressure. The vapors of the plating agent are pulled through the system as the vacuum pump operates, and they impinge on the heated object, decomposing and forming the metallic coating.

In addition to the thermal decomposition techniques discussed hereinabove for decomposing the plating agents of this invention, other methods for decomposition can be employed. Such methods are decomposition of a niobium or tantalum compound by ultrasonic frequency or by ultraviolet irradiation. The former process involves essentially the same procedure as employed in Example VIII with the exception that an ultrasonic generator is proximately positioned to the plating apparatus. The niobium or tantalum compound is then heated to its decomposition threshold and thereafter the ultrasonic generator is utilized to effect final decomposition. Decomposition by ultraviolet irradiation involves essentially the same method as utilized in Example VIII with the exception that in place of the resistance furnace there is utilized for heating a battery of ultraviolet and infrared lamps placed circumferentially around the outside of the heating chamber. The substrate to be heated is brought to a temperature just below the decomposition temperature of the niobium or tantalum plating agent with the infrared heating and thereafter decomposition is effected with ultraviolet rays.

Although the above techniques generally employ the niobium or tantalum plating agent in its vapor phase, other techniques besides vapor phase plating can be employed. For example, the substrate to be plated can be placed in a decomposition chamber and the plating agent packed in contact with the element and thereafter heated to a temperature above the decomposition temperature of the plating agent. The volatile by-products of the decomposition reaction escape leaving an adherent deposit on the substrate.

Deposition of metal on a glass cloth illustrates the latter process. A glass cloth band weighing one gram is dried for one hour in an oven at 150° C. It is then placed in a tube which is devoid of air and there is added to the tube 0.5 gram of bis(cyclopentadienyl) tantalum trihydride. The tube is heated at 400° C. for one hour after which time the tube is cooled and opened. The cloth has a uniform metallic grey appearance and exhibits a gain in weight. The cloth has greatly decreased resistivity and each individual fiber proves to be a conductor. An application of current to the cloth causes an increase in its temperature. Thus, a conducting cloth is prepared. This cloth can be used to reduce static electricity, for decoration, for thermal insulation by reflection, and as a heating element.

These new compounds of this invention are useful antiknocks when added to a petroleum hydrocarbon. Further, they may be used as supplemental antiknocks, that is, in addition to a lead antiknock already present in the fuel. Typical lead antiknocks are the lead alkyls such as tetraethyllead, tetrabutyllead, tetramethyllead and various mixed alkyls such as dimethyldiethyllead, diethyldibutyllead and the like. When used as an antiknock, these compounds may be present in the gasoline in combination with typical halogen scavengers such as ethylene dichloride, ethylene dibromide, and the like.

The novel compounds of this invention are particularly useful as chemical intermediates, fuel and lubricating oil additives, polymerization catalysts, combustion control additives, fungicides, herbicides, pesticides, and bactericides.

Having fully described the novel compounds of our invention, their utilities and the methods used in preparing the compounds, it is desired that this invention be limited only within the scope of the appended claims.

I claim:

1. Process for the formation of a compound having the formula $$Cy_2M^1H_x$$

wherein Cy is a cyclopentadienyl hydrocarbon radical having 5 to 13 carbon atoms and $M^1$ is an atom of a metal elected from the class consisting of Group VB metals of atomic number at least 41 and Group VIB metals, such that when $M^1$ is an atom of a Group VB transition metal of atomic number at least 41, $x=3$, and when $M^1$ is an atom of a Group VIB transition metal, $x=2$, said process comprising reacting
  I. a salt selected from the class consisting of simple niobium, tantalum and Group VIB metal salts of inorganic acids and carboxylic acids having up to 7 carbon atoms with
  II. a cyclopentadienyl metal compound having the formula $Cy_tM^2$ wherein Cy is a cyclopentadienyl hydrocarbon radical having 5 to 13 carbon atoms and $M^2$ an atom of a metal selected from the class consisting of Group IA and Group IIA metals, such that when $M^2$ is an atom of a Group IA metal $t=1$, and when $M^2$ is an atom of a Group IIA metal $t=2$, and
  III. a reducing agent selected from the class consisting of sodium borohydride, sodium borodeuteride, lithium aluminum hydride and lithium aluminum deuteride.

2. Process for the formation of dicyclopentadienyl tantalum trihydride, said process comprising reacting tantalum pentachloride with sodium cyclopentadienide and with sodium borohydride.

3. The process of claim 1 wherein said salt is a simple salt of an inorganic acid.

4. The process of claim 3 wherein said inorganic acid is hydrochloric acid.

5. The process of claim 1 being conducted in the presence of an inert organic solvent.

6. The process of claim 5 wherein said inert solvent is tetrahydrofuran.

7. The process of claim 1 wherein said reducing agent is sodium borohydride.

8. Process for the preparation of a compound having the formula $$(C_5H_5)_2M^1H_x$$

wherein $M^1$ is an atom of a metal selected from the class consisting of Group VB elements having an atomic number of at least 41 and Group VIB metals, and $x$ is an integer such that when $M^1$ is a Group VB metal of at least 41, $x=3$ and when $M^1$ is an atom of a Group VIB metal, $x=2$, said process comprising reacting a chloride of a metal selected from the class consisting of Group VB metals having an atomic number of at least 41 and Group VIB metals, with cyclopentadienyl sodium and sodium borohydride.

9. Process for the preparation of dicyclopentadienyl molybdenum dihydride, said process comprising reacting molybdenum pentachloride with cyclopentadienyl sodium and sodium borohydride.

10. Process for the preparation of dicyclopentadienyl tungsten dihydride, said process comprising reacting tungsten hexachloride with cyclopentadienyl sodium and sodium borohydride.

References Cited by the Examiner

UNITED STATES PATENTS

| | | | |
|---|---|---|---|
| 2,818,416 | 12/1957 | Brown et al. | 260—429 |
| 2,916,400 | 12/1959 | Homer et al. | 117—107 |
| 2,921,868 | 1/1960 | Berger | 117—107 |
| 2,960,514 | 11/1960 | Brown | 260—429 |
| 2,987,528 | 6/1961 | Brown | 260—429 |

TOBIAS E. LEVOW, *Primary Examiner.*

W. J. VAN BALEN, T. L. IAPALUCCI, A. DEMERS,
*Assistant Examiners.*